2,920,056

PLASTICIZER FROM POLYMETHYLOL ALKANES AND 3-ALKYL ALKANOIC ACIDS AND POLYMERIC COMPOSITIONS CONTAINING SAME

Fred W. Banes and Isidor Kirshenbaum, Westfield, and Jeffrey H. Bartlett, New Providence, N.J., assignors to Esso Research and Engineering Company, a corporation of Delaware No Drawing. Application June 6, 1957
Serial No. 663,883

16 Claims. (Cl. 260—31.6)

The present invention relates to plasticizers and particularly to the use of certain esters as plasticizers in the formulation of synthetic resins. Specifically, it relates to superior plasticizers made by the esterification of di-, tri-, or tetramethylol alkanes containing a neopentyl carbon atom solely with certain specific branched-chain acids, viz., 3-alkyl alkanoic acids, having from 6 to 9 carbon atoms.

This application is a continuation-in-part of co-pending application Serial No. 607,564, filed September 4, 1956.

In the earlier case it was noted that esters of trimethylol alkanes produced from $C_7$-$C_8$ acids, when combined with synthetic resins such as those prepared from vinyl compounds, give a product having aging characteristics superior to those obtained with conventional plasticizers such as di-isooctyl phthalate (DIOP) and di-2-ethyl hexyl phthalate (DOP). Contrary to earlier teachings that straight-chain acid esters are better plasticizers than branched-chain acid esters, it was found that mixtures of straight- and branched-chain acids also produce suitable trimethylol plasticizers.

Now it has been found that particularly outstanding plasticizers can be prepared from certain polymethylol alkanes and pure branched-chain 3-alkyl alkanoic acids, wherein all of the hydroxyl groups of the alkane are esterified by the pure branched-chain alkanoic acid. The raw materials for these particular plasticizers are readily available, rendering the preparation of the plasticizers economically desirable. When employed in the formulation of resinous polymers, such as polyvinyl chloride, the present plasticizers result in improved plasticizer efficiency as evidenced by torsional modulus and as evidenced by tensile and elongation retention.

Therefore, an object of the present invention is to prepare a novel ester plasticizer from a polymethylol alkane and a pure branched-chain acid. Another object is to provide an efficient plasticizer for the formulation of stable resinous polymers. A further object is to provide a convenient and economic method of preparing a plasticizer for resinous polymers.

The branched-chain acids suitable for the invention are the 3-alkyl alkanoic acids having from 6 to 9 carbon atoms, i.e., 3-methyl pentanoic acid, 3-methyl hexanoic acid, 3-methyl heptanoic acid, 3-ethyl pentanoic acid, 3-ethyl hexanoic acid, 3-methyl octanoic acid, etc., or mixtures thereof. The 3-methyl hexanoic acid is preferred, and it may conveniently be prepared in a highly pure form by the dimerization of propylene to form 2-methyl pentene-1 (according to the method of Ziegler as described in U.S. Patent 2,695,327) and the subsequent oxonation of the dimer olefin to the 3-methyl hexanoic acid. Correspondingly, the other above-mentioned acids can be prepared by a similar combination of dimerization and oxonation steps. However, this invention is not limited to any particular source of the acids, the sole requirement being that the acid is obtained in a relatively pure state, i.e., at least 80% pure.

The polymethylol alkanes which may be used are the di-, tri-, and tetramethylol alkanes having a total of 5 to 11 carbon atoms and wherein the methylol groups are attached to the same neopentyl carbon atom. Accordingly, these polymethylols may be represented by the formula:

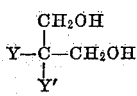

wherein Y and Y' are selected from the group consisting of —$CH_2OH$ and $C_1$—$C_7$ alkane groups and where the carbon atoms in Y+Y' do not total more than 8. Included within this definition are pentaerythritol, trimethylolethane, trimethylolpropane, trimethylol-n-butane, trimethylolisobutane, trimethylolpentane, trimethylolhexane, trimethylolheptane, trimethyloloctane, neopentyl glycol, etc. The $C_6$-$C_8$ trimethylols and pentaerythritol are preferred. The polymethylol derivatives are generally prepared from the corresponding aldehyde, i.e., aldehydes having one or more active hydrogen atoms attached to the carbon atom adjacent to the aldehyde group. For example, pentaerythritol is prepared by the reaction of acetaldehyde with formaldehyde in the presence of a basic catalyst; trimethylolbutane from n-valeric aldehyde and formaldehyde; dimethyl neopentyl glycol from isobutyraldehyde and formaldehyde, etc. Any source of aldehyde, of course, is suitable such as those prepared by the Oxo synthesis, involving the reaction of an olefin with carbon monoxide and hydrogen in the presence of a cobalt-containing catalyst.

In the preparation of the trimethylol esters, approximately 1 to 2 moles, preferably about 1.1 to 1.2 moles, of the 3-alkyl alkanoic acid is reacted with each mole of available hydroxyl group of the polymethylol alkane. The reaction is conducted in the presence of a water-entraining agent such as toluene, xylene, heptane, or other suitable hydrocarbons or the like, and about 0.5 to 5.0 weight percent of an esterification catalyst such as sulfuric acid, para-toluene sulfonic acid, etc., per mole of polymethylol. The esterification generally takes between 2 and 10 hours at a temperature between 100° and 200° C., preferably 3 to 5 hours at 125° to 175° C.

When the 3-alkyl alkanoic acid is prepared by the preferred method of dimerization according to the process described in U.S. Patent 2,695,327, followed by oxonation of the resulting dimer, the conditions are as follows. The dimerization is carried out at temperatures ranging from 80° to 250° C., in the presence of a dimerization activator such as aluminum tripropyl, aluminum trihydride, other aluminum trialkyls, and equivalents. The reaction pressure is maintained between atmospheric and 30,000 p.s.i.g. or greater. The oxonation of the dimer is conducted at pressures between 1,000 and 6,000 p.s.i.g. and at temperatures between 70° and 200° C. The resulting aldehyde is oxidized by air or oxygen blowing at atmospheric pressure and at temperatures between 20° and 100° C., preferably between 40° and 50° C. The acid is then purified by fractional distillation or similar means and is recovered in at least 80% purity, preferably 98–99% purity.

When the polymethylol alkanes are prepared by the Oxo synthesis of the aldehyde followed by the conversion of the aldehyde to the polymethylol, the conditions are as follows. The oxonation reaction is conducted in the same manner and under the same temperature and pressure as described above with reference to the alkanoic acid preparation. The Oxo aldehyde, or any aldehyde, is then reacted with formaldehyde in the presence of a caustic, preferably between 10 and 15° C., for the first half of the reaction. The temperature is then raised above room temperature, preferably between 50 and 60° C. for the second half of the reaction, whereupon the reaction mixture is neutralized and the aqueous phase is separated from the organic polymethylol alkane phase.

In the practice of the present invention, the 3-alkyl alkanoic acid esters of the polymethylol alkanes are efficient plasticizers, and when they are combined with a solid polymer, such as a vinyl chloride resin, a product is formed having aging characteristics superior to those polymers treated with conventional plasticizers.

The amount of plasticizer employed will vary according to the particular polymer used and type of product desired, but will most generally be a minor proportion in relation to the polymer. It is generally desirable to use between about 25 and 75 parts by weight of plasticizer per 100 parts by weight of the polymer, and it is preferred to use between about 40 and 60 parts by weight of plasticizer. For instance, in the case of resins prepared with vinyl chloride, a satisfactory formula may contain about 50 parts by weight of the plasticizer.

The polymers in which the plasticizers of the present invention are particularly effective are synthetic resins prepared from vinyl compounds, such as vinyl chloride, vinyl acetate and copolymers thereof, as well as from vinylidene chloride, acrylates, and the like. The vinyl chloride-acetate copolymers are preferable and are generally composed of about 80 to 95 weight percent vinyl chloride and 5 to 20 weight percent vinyl acetate. The polymerization is usually carried out between about 20 and 100° C. in the presence of a peroxide catalyst, such as benzoyl peroxide, acetyl benzoyl peroxide, etc. The specific viscosity (68/68° F.) of these resins is generally between about 0.2 to 1.2.

In addition to the plasticizer, the resin may contain various known stabilizers. Suitable as stabilizers are substituted phenols such as p-ethoxyphenol, p- and m-aminophenol, diethyl ether of hydroquinone, etc.; amines such as 2-nitrodiphenylamine, 2-ethyl hexylamine, etc.; urea derivatives such as phenyl thiourea, diphenyl guanidine, etc.; azoline compounds such as 2-imidazoline-2-thiol, 5,5-dimethyl-2-mercaptooxazoline, etc.; azole compounds such as 2-mercaptothiazole, 2-mercaptobenzoxazole, etc.; heavy metal-containing organic compounds such as barium ricinoleate, dibasic lead stearate, dibasic lead carbonate, cadmium naphthenate, strontium and zinc laurate, dibutyl tin dilaurate, etc.; organo phosphorus compounds such as triphenyl phosphite, trioctyl phosphite, sodium organophosphate, e.g., "Vanstay," and the like. These substances are generally used in amounts between about 0.1 and 15 parts by weight per 100 parts by weight of polymer, but it is preferred to use between about 1 to 5 parts by weight of stabilizer. In addition, cadmium and calcium stearate can be used as lubricants as well as stabilizers. Phenyl salicylate, resorcinol dibenzoate and phosphates and the like may be used to stabilize the resin against discoloration in sunlight.

The following specific examples are submitted in order to give a better understanding of the present invention, but not to limit the invention. Unless otherwise specified, all ratios and percentages are given throughout on a weight basis.

EXAMPLE I

(A) Preparation of 3-methyl hexanoic acid

Thirty moles of liquid propylene was mixed in an autoclave and heated with one mole of aluminum tripropyl (diluted to a 10 volume percent solution in pentane) to a temperature of about 180° C. and a pressure of about 170 atmospheres. After a few hours, the pressure dropped to about 40 atmospheres and additional propylene was added under pressure. The reaction was continued until the autoclave was filled with reaction products, and propylene dimer, i.e., 2-methyl pentene-1, was separated from the reaction mixture in about 70% yield. The dimer was charged to a stainless steel reactor where it was heated at constant volume temperatures between about 150° and 180° C. and at a pressure of about 3,500 p.s.i.g., in the presence of a cobalt carbonyl catalyst preformed from cobalt acetate (0.1% Co based on dimer feed) and a 1/1 ratio of CO and $H_2$. After 5 hours the crude reaction product was decobalted by washing with an aqueous solution of cobalt acetate, water-washing, and distilling. The purified 3-methylhexanal-1 was then air blown at about 40 to 50° C. and the product was fractionally distilled. Three-methyl hexanoic acid was recovered in 98–99% purity.

(B) Preparation of trimethylolisobutane

Isobutylene was oxonated in the same manner as the propylene dimer in A, at a temperature between 150 and 180° C. and a pressure of about 3,500 p.s.i.g. One mole of resulting isovaleraldehyde, 4 moles of formaldehyde in a 37% aqueous solution, and 1 mole isopropyl alcohol were charged to an open reactor. One and one-tenth moles of sodium hydroxide (125 cc. in aqueous solution) were slowly added to the other reactants with vigorous stirring, maintaining the temperature between 10° and 15° C. for 3 hours. The temperature was then raised and maintained between 50° and 60° C. for another 3 hours. The reaction mixture was neutralized and an aqueous phase separated from an organic phase. The aqueous layer was salted out with NaCl and extracted with isopropyl alcohol. The alcohol extract was added to the organic layer and the isopropyl alcohol was then evaporated on a steam bath. The remaining crude trimethylolisobutane was extracted with acetone, filtered, and distilled. The resulting pure product distilled at 135–145° C. at about 0.5 mm. pressure. It was a white solid melting at 82° C.

(C) Preparation of ester of trimethylolisobutane and 3-methyl hexanoic acid

One mole (148 gms.) of the alcohol product of B and 3.3 moles (429 gms.) of the acid product of A in the presence of 2 gms. of p-toluene sulfonic acid were mixed with 300 cc. of toluene and the solution maintained at the boiling point of the mixture until no more water could be removed as an azeotrope. The reaction mixture was then diluted with toluene and washed with 5% NaOH solution and finally with water to remove all acids. Toluene was evaporated on a steam bath and the crude ester was purified by vacuum distilling through a short path still.

EXAMPLE II

In this example, polymers were compounded according to the following formula in which the only variable is the particular plasticizer under consideration:

Ingredients: Parts by weight
Vinyl chloride resin (Geon 101) _____ 100
Dibasic lead stearate _____ 1
Plasticizer _____ 50

Geon 101 is a 100% polyvinyl chloride resin. It is a white powder having a specific gravity of 1.40±0.05, a specific viscosity of 0.52 to 0.57, a heat loss maximum of 0.5% and an ash of 0.4%. One hundred parts by weight of the polyvinyl chloride resin was admixed with 1 part dibasic lead stearate to form a dry blend. Next, 50 parts by weight of plasticizer were mixed with the blend until an almost lump-free composition was obtained. The resulting mixture was then homogenized in a Banbury mixer, and sheeted into a finished film having a thickness of between about 0.075 and 0.15 inch.

Polymer compositions were prepared according to the above recipe employing a branched-chain polymethylol plasticizer of the present invention as well as conventional DIOP and DOP plasticizers, straight-chain polymethylol ester plasticizers, and branched-chain trimethylol esters of acids other than 3-alkyl alkanoic acid. The physical properties of the finished product were determined on the aforedescribed molded films, and the aging characteristics were determined after heating the films in an air oven, conventionally designed for temperature and air circulation, at a temperature of about 100° C. for a period of 7 days. All these properties are tabulated in Table I.

The value of a plasticizer is measured by the tensile strength of the polymer plasticized, the percentage elongation of the polymer, the percentage of these original properties retained after aging of the polymer, and the torsional modulus of the polymer at room and low temperatures. The higher the tensile strength, the percentage elongation, and the percentage retention, and the lower the modulus, the better is the plasticized polymer. The data in Table I are strong evidence of the superiority of the polymethylol esters of alkanoic acids having an alkyl group at the 3 position on the alkanoic chain. There it is observed that the plasticizer of the instant invention (run 1) results in polymers of much better low temperature modulus and aging characteristics than the conventional DIOP (run 2) and DOP (run 3) plasticizers. The instant plasticizer is superior to straight-chain acid esters (runs 4 and 5) with respect to original tensile and elongation properties. In addition, the branched-chain acid from which the present plasticizer is made is more readily obtained than the straight-chain acids. Finally, it is noted that other branched-chain acid esters (run 6) are highly inefficient, especially with respect to aging characteristics and low temperature modulus. The $C_7$ Oxo acid of run 6 is a mixture of various branched-chain acids, especially rich in 2-methyl hexanoic acid and other acids not substituted at the 3 position, produced via the Oxo reaction. For the advantages of the present invention to be fully realized, the alkyl group must be substituted at the 3 position of the alkanoic acid. The 3-alkyl alkanoic acid must be obtained in a relatively pure form, i.e., 80%, in order to keep other branched-chain acids from inhibiting its especial value.

actant having 6 to 9 carbon atoms to the molecule, said reactant being at least 80% 3-alkyl alkanoic acids, and a $C_6$–$C_8$ trimethylol alkane reactant wherein the methylol groups are attached to the same neopentyl carbon atom, said reactants being reacted at a temperature between 100° and 200° C.

4. A plasticizer according to claim 3 wherein 1 to 2 moles of the acid reactant are reacted per mole of available hydroxyl group on the trimethylol alkane reactant.

5. A plasticizer according to claim 3 wherein the 3-alkyl alkanoic acids are 3-methyl hexanoic acid.

6. A plasticizer according to claim 3 wherein the trimethylol alkane is trimethylolisobutane.

7. A plasticized polymeric composition which comprises 100 parts by weight of a polyvinyl resin selected from the group consisting of polyvinyl chloride, polyvinyl acetate and vinyl chloride-vinyl acetate copolymers and 25 to 75 parts by weight of the ester of a 3-alkyl alkanoic acid having 6 to 9 carbon atoms and a polymethylol alkane selected from the group consisting of di-, tri-, and tetramethylol alkanes having a total of 5 to 11 carbon atoms and wherein the methylol groups are attached to the same neopentyl carbon atom.

8. A plasticized polymeric composition according to claim 7 wherein said polyvinyl resin is polyvinyl chloride.

9. A plasticized polymeric composition according to claim 7 wherein said polyvinyl resin is polyvinyl acetate.

10. A plasticized polymeric composition according to claim 7 wherein said polyvinyl resin is a copolymer of 80 to 95 weight percent vinyl chloride and 5 to 20 weight percent vinyl acetate.

11. A plasticized polymeric composition which comprises 100 parts by weight of a polyvinyl resin selected from the group consisting of polyvinyl chloride, polyvinyl acetate, and vinyl chloride-vinyl acetate copolymers; 25 to 75 parts by weight of the ester of a $C_6$–$C_9$ alkanoic acid,

TABLE I

| Run | Plasticizer | Original Physical Properties | | | | Aging Characteristics | |
|---|---|---|---|---|---|---|---|
| | | Tensile Strength, p.s.i.g. | Elongation, Percent | Torsional Modulus | | Tensile Strength Retained, Percent of Original | Elongation Retained, Percent of Original |
| | | | | @ +25° C. | @ −25° C. | | |
| 1 | Ester of trimethylolisobutane and 3-methyl hexanoic acid. | 2,900 | 320 | 0.37 | 15 | 100 | 97 |
| 2 | DIOP | 3,000 | 305 | 0.34 | 24.8 | | |
| 3 | DOP | 3,000 | 315 | 0.34 | 27.3 | 90 | 62 |
| 4 | Ester of trimethylolisobutane and n-heptanoic acid. | 2,775 | 295 | 0.30 | 16.3 | 96 | 98 |
| 5 | Ester of trimethylolisobutane and n-octanoic acid. | 2,570 | 275 | 0.48 | 14.8 | 102 | 104 |
| 6 | Ester of trimethylolisobutane and $C_7$ Oxo acid prepared from mixed $C_6$ olefins. | 2,885 | 310 | 0.33 | 27.9 | 87 | 69 |

Having described the general nature and use of the present invention, the true scope is particularly pointed out in the appended claims.

What is claimed is:

1. A plasticizer for synthetic resins comprising the ester of a 3-alkyl alkanoic acid having a total of 6 to 9 carbon atoms and a polymethylol alkane selected from the group consisting of di-, tri-, and tetramethylol alkanes having a total of 5 to 11 carbon atoms and wherein the methylol groups are attached to the same neopentyl carbon atom.

2. A plasticizer according to claim 1 wherein the polymethylol alkane is a trimethylol alkane having 6 to 8 carbon atoms, and the alkanoic acid is 3-methyl hexanoic acid.

3. A plasticizer for synthetic resins consisting essentially of the esterification product of an alkanoic acid resaid acid being at least 80% 3-alkyl alkanoic acid, and a $C_6$–$C_8$ trimethylol alkane wherein the methylol groups are attached to the same neopentyl carbon atom; and 0.1 to 15 parts by weight of an organic stabilizer for said polyvinyl resin.

12. A plasticized polymer according to claim 11 wherein the trimethylol alkane is trimethylolpropane.

13. A plasticized polymer according to claim 11 wherein the trimethylol alkane is trimethylolisobutane.

14. A plasticized polymer according to claim 11 wherein the trimethylol alkane is trimethylol-n-butane.

15. A plasticizer for synthetic resins consisting essentially of the esterification product of an alkanoic acid reactant having 6 to 9 carbon atoms to the molecule, said reactant being at least 80% 3-alkyl alkanoic acid, and pentaerythritol reactant, said reactants being reacted at a temperature of between 100° and 200° C.

16. A plasticized polymeric composition which comprises 100 parts by weight of a polyvinyl resin selected from the group consisting of polyvinyl chloride, polyvinyl acetate, and vinyl chloride-vinyl acetate copolymers; 25 to 75 parts by weight of the ester of a $C_6$–$C_9$ alkanoic acid, said acid being at least 80% 3-alkyl alkanoic acid, and pentaerythritol; and 0.1 to 15 parts by weight of an organic stabilizer for said polyvinyl resin.

References Cited in the file of this patent

UNITED STATES PATENTS

| | | |
|---|---|---|
| 2,409,548 | Debacher | Oct. 15, 1946 |
| 2,695,327 | Ziegler | Nov. 23, 1954 |
| 2,729,665 | Buckmann | Jan. 3, 1956 |
| 2,779,808 | Whitaker | Jan. 29, 1957 |